(12) United States Patent
Hu et al.

(10) Patent No.: US 11,748,176 B2
(45) Date of Patent: Sep. 5, 2023

(54) EVENT MESSAGE MANAGEMENT IN HYPER-CONVERGED INFRASTRUCTURE ENVIRONMENT

(71) Applicant: Dell Products L.P., Round Rock, TX (US)

(72) Inventors: Lixia Hu, Shanghai (CN); Tianhe Li, Shanghai (CN); Zhuo Zhang, Shanghai (CN); Kai Zhou, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/695,611

(22) Filed: Mar. 15, 2022

(65) Prior Publication Data
US 2023/0205611 A1    Jun. 29, 2023

(30) Foreign Application Priority Data
Dec. 23, 2021    (CN) .......................... 202111593266.8

(51) Int. Cl.
*G06F 9/54*    (2006.01)
*H04L 43/10*    (2022.01)

(52) U.S. Cl.
CPC .............. *G06F 9/542* (2013.01); *G06F 9/546* (2013.01); *H04L 43/10* (2013.01)

(58) Field of Classification Search
CPC ..... G06F 9/542; G06F 16/1734; H04L 41/06; H04L 41/0604
See application file for complete search history.

(56) References Cited

U.S. PATENT DOCUMENTS

| 9,881,071 | B2 * | 1/2018 | Slavicek | ............... G06F 16/285 |
| 10,659,371 | B1 * | 5/2020 | Jain | ......................... H04L 67/51 |
| 10,911,295 | B2 * | 2/2021 | Umezawa | ........... H04L 41/0663 |

\* cited by examiner

*Primary Examiner* — Andy Ho
(74) *Attorney, Agent, or Firm* — Jackson Walker L.L.P

(57) ABSTRACT

An information handling system and method for managing event messages in a distributed computing environment employing a hyper-converged infrastructure (HCI) architecture in which a central controller is configured to send heartbeats, indicative of a message handling capacity of the central controller, to a plurality of nodes within a management domain of the controller. Each node maintains an event messaging state of the central controller based on the heartbeats. When a node detects the occurrence of a reportable event, the node determines a reporting policy corresponding to the event messaging state of the central controller and takes an event message action in accordance with the reporting policy. The event message action may include sending the event message without delay or storing the event message for subsequent sending.

20 Claims, 4 Drawing Sheets

EVENT MESSAGE MANAGEMENT IN HYPER-CONVERGED INFRASTRUCTURE ENVIRONMENT

TECHNICAL FIELD

The present disclosure relates to system management and, more specifically, management of messages in a virtualized environment.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Increasingly, standard hardware including, as a non-limiting example, x86-based servers, are employed in hyper-converged infrastructure (HCI) environments. For purposes of this disclosure, HCI may be characterized as an information technology (IT) paradigm in which compute, storage, networking, and management functionality are all implemented in virtualized nodes.

In an HCI environment, a management resource may monitor the health of each node based, at least in part, on event messages sent by the nodes in response to various events or conditions. An HCI environment may encompass hundreds or thousands of servers, resulting in a potentially very large number of event messages from a very large number of sources. If the event message traffic approaches or exceeds the capacity of the management resource to process each message with little or no appreciable delay, the management resource's responsiveness may be slowed and the environment's performance and/or quality of service parameters may be negatively impacted.

SUMMARY

In accordance with teachings disclosed herein, common problems associated with event message handling in a distributed system are addressed by an information handling system and method for managing event messages in which a central controller is configured to send heartbeat messages, also referred to herein simply as heartbeats, indicative of a message handling capacity of the central controller, to a plurality of nodes. Each of the nodes is configured to receive the heartbeats from the central controller and to maintain an event messaging state of the central controller based on the heartbeats. When a node detects the occurrence of a reportable event, the node determines a reporting policy corresponding to the event messaging state of the central controller and takes an event message action in accordance with the reporting policy. The event message action may include sending the event message without delay or storing the event message for subsequent sending. In at least some embodiments, the plurality of nodes includes each node managed by the central controller and each heartbeat includes one or more uniform datagram protocol (UDP) compliant packets multicast, by the central controller, to the managed nodes.

Some embodiments implement a finite group of heartbeat types and a finite group of event messaging states wherein each heartbeat is of a type selected from the group of heartbeat types and each event messaging state is selected from the group of event messaging states. In at least one embodiment, the heartbeat types include a normal heartbeat type and the event messaging states include an active state wherein each node is configured to assign the active state to the central controller in response to receiving a normal heartbeat from the central controller. In addition, the reporting policy corresponding to the active state may require or enable each node to report new events to the central controller immediately or without appreciable delay.

The heartbeat types may further include a flow control heartbeat type wherein the central controller is configured to send a flow control heartbeat in response to detecting a message handling capacity below a threshold capacity. In embodiments that include and/or support a flow control heartbeat type, the group of event messaging states may include a restricted state that is associated with the flow control heartbeat type and each node may transition the central controller's event messaging state to the restricted state in response to receiving a flow control heartbeat from the central controller. The reporting policy corresponding to the restricted state may impose, on one or more of the nodes, a minimum interval between event messages, wherein the minimum interval may be explicitly indicated within, or otherwise as part of, the flow control heartbeat. The flow control heartbeat may include an indication of which nodes the heartbeat is intended for.

The heartbeat types may also include a suspend heartbeat and the central controller is configured to send a suspend message prior to a central controller reboot. In these embodiments, the event messaging states may include a pending state and each node may be configured to transition the event messaging state to the pending state responsive to receiving a suspend heartbeat, wherein the pending state prevents the plurality of nodes from sending reporting messages. In at least some such embodiments, each node receiving the suspend heartbeat records an identifier of a last reported message and thereafter stores new event messages without reporting them to the central controller until the central controller transitions out of the pending state, such as by sending a normal heartbeat.

The heartbeat types may include a recover heartbeat and the nodes may be configured to transition the event messaging state to the active state from either the restricted state or the pending state responsive to receiving a recover heartbeat. Any node in which the event messaging state is pending may respond to receiving the recover heartbeat by sending stored messages occurring after the last recorded message to the central controller.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
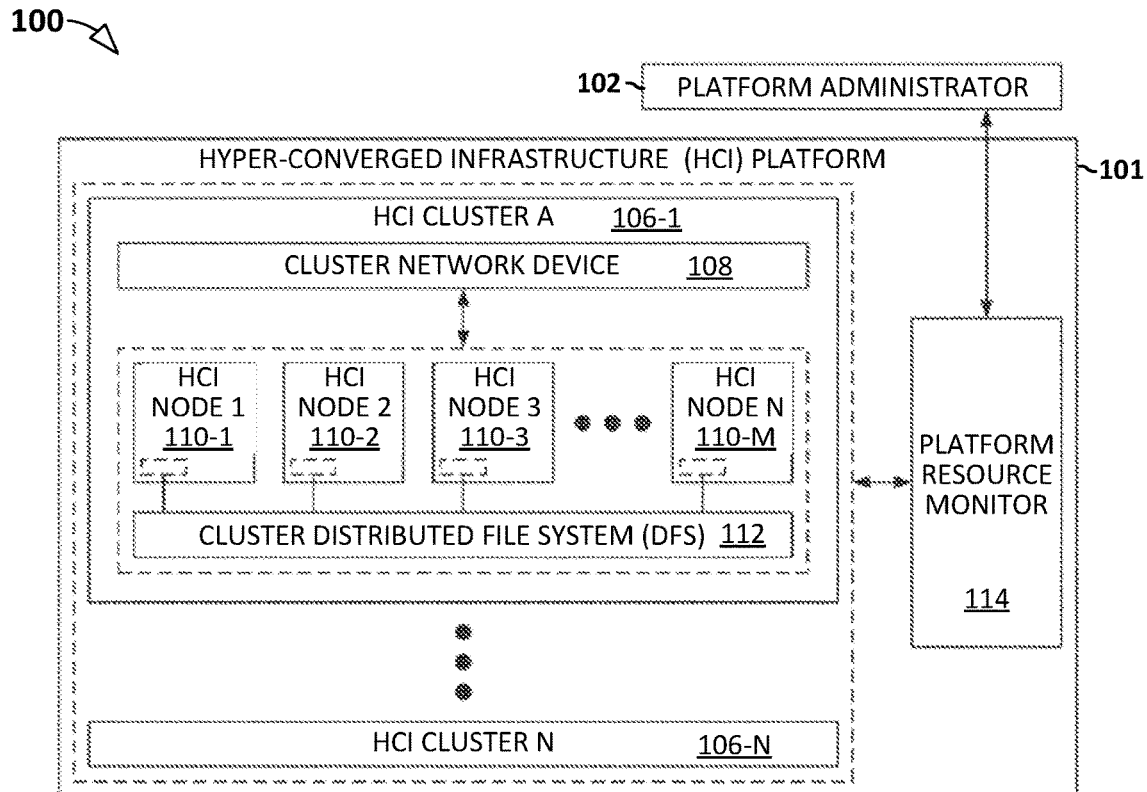
FIG. 1 illustrates a block diagram of an HCI platform.

Exemplary embodiments and their advantages are best understood by reference to FIGS. 1-6, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

Before describing disclosed features for monitoring and managing event messages in a distributed computing environment, an exemplary HCI platform suitable for implementing these features is provided. Referring now to the drawings, FIG. 1 illustrates an exemplary information handling system 100. The information handling system 100 illustrated in FIG. 1 includes a platform 101 communicatively coupled to a platform administrator 102. The platform 101 illustrated in FIG. 1 is an HCI platform in which compute, storage, and networking resources are virtualized to provide a software defined information technology (IT) infrastructure. Platform administrator 102 may be any computing system with functionality for overseeing operations and maintenance pertinent to the hardware, software, and/or firmware elements of HCI platform 101. Platform administrator 102 may interact with HCI platform 101 via requests to and responses from an application programming interface (API) (not explicitly depicted). In such embodiments, the requests may pertain to event messaging monitoring and event messaging state management described below. The HCI platform 101 illustrated in FIG. 1 may be implemented as or within a data center and/or a cloud computing resource featuring software-defined integration and virtualization of various information handling resources including, without limitation, servers, storage, networking resources, management resources, etc.

The HCI platform 101 illustrated in FIG. 1 includes one or more HCI clusters 106-1 through 106-N communicatively coupled to one another and to a platform resource monitor (PRM) 114. Each HCI cluster 106 illustrated in FIG. 1 encompasses a group of HCI nodes 110-1 through 110-M configured to share information handling resources. In some embodiments, resource sharing may entail virtualizing a resource in each HCI node 110 to create a logical pool of that resource, which, subsequently, may be provisioned, as needed, across all HCI nodes 110 in HCI cluster 106. For example, when considering storage resources, the physical device(s) (e.g., hard disk drives (HDDs), solid state drives (SSDs), etc.) representative of the local storage resources on each HCI node 110 may be virtualized to form a cluster distributed file system (DFS) 112. In at least some such embodiments, cluster DFS 112 corresponds to a logical pool of storage capacity formed from some or all storage within an HCI cluster 106.

An HCI cluster 106, and the one or more HCI nodes 110 within the cluster, may represent or correspond to an entire application or to one or more of a plurality of micro services that implement the application. As an example, an HCI cluster 106 may be dedicated to a specific micro service in which multiple HCI nodes 110 provide redundancy and support high availability. In another example, the HCI nodes 110 within HCI cluster 106 include one or more nodes corresponding to each micro service associated with a particular application.

The HCI cluster 106-1 illustrated in FIG. 1 further includes a cluster network device (CND) 108, which facilitates communications and/or information exchanged between the HCI nodes 110 of HCI cluster 106-1 and other clusters 106, PRM 114, and/or one or more external entities including, as an example, platform administrator 102. In at least some embodiments, CND 108 is implemented as a physical device, examples of which include, but are not limited to, a network switch, a network router, a network gateway, a network bridge, or any combination thereof.

PRM 114 may be implemented with one or more servers, each of which may correspond to a physical server in a data center, a cloud-based virtual server, or a combination thereof. PRM 114 may be communicatively coupled to all HCI nodes 110 across all HCI clusters 106 in HCI platform 101 and to platform administrator 102. PRM 114 may include a resource utilization monitoring (RUM) service or feature with functionality to monitor resource utilization parameters (RUPs) associated with HCI platform 101.

Figure 2:
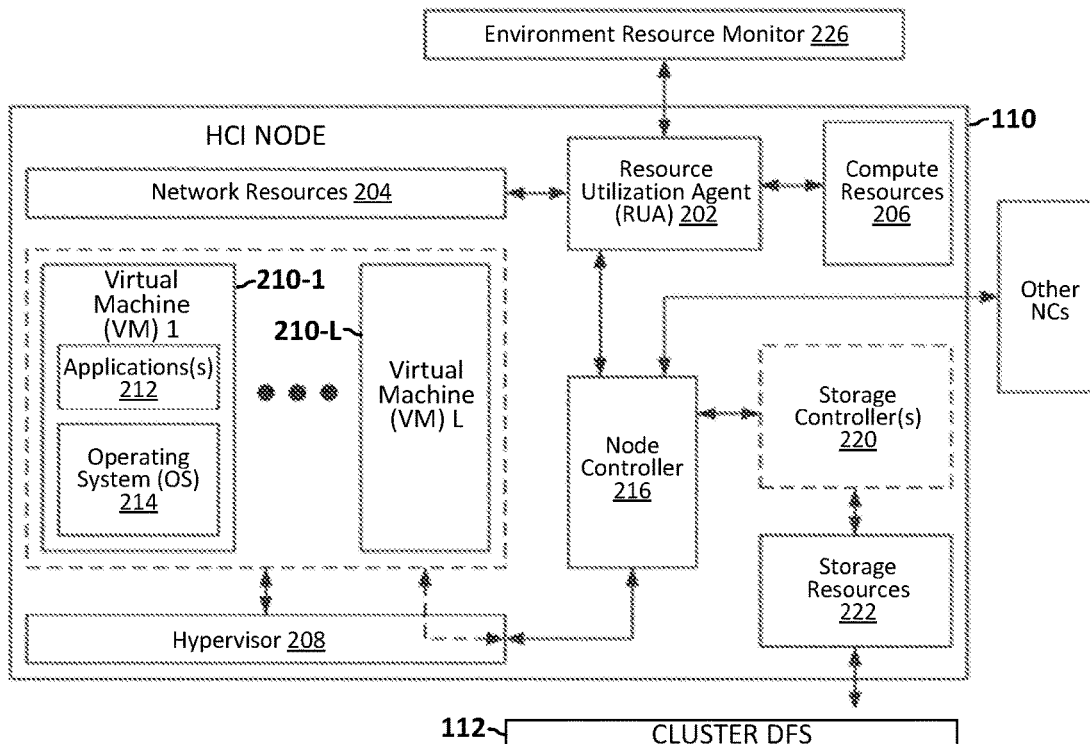
FIG. 2 illustrates a block diagram of an HCI node.

FIG. 2 illustrates an exemplary HCI node 110 in accordance with disclosed subject matter. HCI node 110, which may be implemented with a physical appliance, e.g., a server (not shown), implements hyper-convergent architecture, offering the integration of virtualization, compute, storage, and networking resources into a single solution. HCI node 110 may include a resource utilization agent (RUA) 202 communicatively coupled to network resources 204, compute resources 206, and a node controller 216. The node controller 216 illustrated in FIG. 2 is coupled to a hypervisor 208 that supports one or more virtual machines (VMs) 210-1 through 210-L, each of which comprises an operating system (OS) 214 and one or more application program(s) 212. The illustrated node controller 216 is further coupled to storage components including zero or more optional storage controllers 220, for example, a small computer system interface (SCSI) controller, and storage components 222.

In some embodiments, RUA 202 is tasked with monitoring the utilization of virtualization, compute, storage, and/or network resources on HCI node 110. Thus, the node RUA 202 may include functionality to monitor the utilization of: network resources 204 to obtain network resource utilization parameters (RUPs), compute resources 206 to obtain compute RUPs, virtual machines 210 to obtain virtualization RUPs, and storage resources 222 to obtain storage RUPs. RUA 202 may provide some or all RUPs to environment resource monitor (ERM) 226 periodically through pull and/or push mechanisms.

Figure 3:
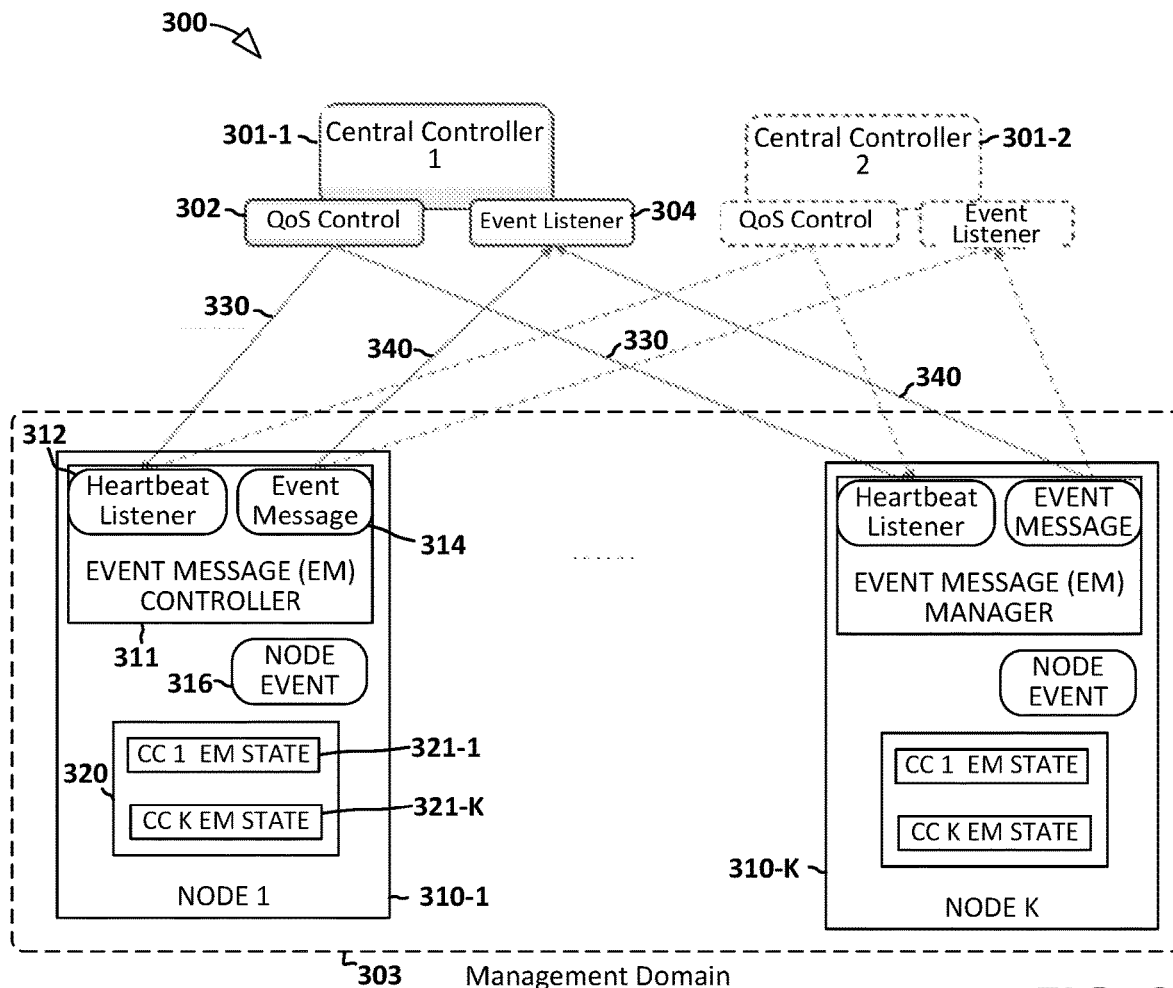
FIG. 3 illustrates a block diagram of event message handling resources.

Turning now to disclosed features for monitoring and managing event messages in a distributed computing environment, FIG. 3 illustrates exemplary event messaging resources 300 for use in conjunction with the HCI platform 101 illustrated in FIG. 1. The event messaging resources 300 illustrated in FIG. 3 include one or more central controllers 301, two of which are illustrated in FIG. 3 as central controller 1 (301-1) and central controller 2 (301-2). The illustrated event messaging resources 300 further include a plurality of nodes 310, two of which are illustrated in FIG. 3 as Node 1 (310-1) and Node K (310-K).

Each node 310 illustrated in FIG. 3 may correspond to an instance of the HCI nodes 110 illustrated in FIG. 1. In at least some embodiments, the nodes 310 that communicate with any particular central controller 301 may comprise all nodes that have established a management trust relationship with the particular central controller. The set of nodes 310 that have established a management trust relationship with a central controller 301 may be referred to as managed nodes and the term management domain may be used herein to refer collectively to all such managed nodes. Thus, FIG. 3 illustrates a management domain 303 consisting of the managed nodes of central controller 1 (301-1), i.e., the nodes 310 managed by a central controller 1 (301-1), e.g., central controller 301-1.

Each central controller 301 depicted in FIG. 3 includes a quality of service (QoS) control resource 302 and an event listener 304 while each node 310 includes an event message (EM) controller 311 and storage 320 for storing event message states 321 corresponding to each central controller 301. Each central controller 301 may be implemented as or within a component of the HCI-based information handling system 100 illustrated in FIG. 1. As examples, a central controller 301 may be implemented within the platform administrator 102 (FIG. 1), platform resource monitor 114 (FIG. 1), environment resource monitor 226 (FIG. 2), or another suitable physical or virtual system, device, or resource.

In at least one embodiment, QoS control resource 302 is configured to generate heartbeats 330 and broadcast heartbeats 330 to each node 310 managed by central controller 301. Central controllers 301 may generate heartbeats 330 to convey an event message handling capacity of the central controller. To illustrate, QoS control resource 302 may generate a first type of heartbeat when event message handling capacity is comparatively high, a second type of heartbeat when event message handling capacity is comparatively low, and zero or more other types of heartbeats including heartbeat types described below with respect to FIG. 4.

The heartbeat listener 312 in each event message controller 311 receives and processes heartbeats 330 from each central controller 301 that manages one or more aspects of the node 310. In at least some implementations, each event message controller 311 maintains a set of event message states 321 for each central controller 301. These event message states 321 are illustrated in FIG. 3 stored in a storage resource 320 of each node 310. In at least one embodiment, the event messaging state 321 for a central controller determines or influences the manner in which node 310 generates and sends event messages 340 to the applicable central controller to report node events 316 that occur from time to time during node operations. Reportable events may include, by way of example, any change in the configuration of node 310 including any change in the hardware, software, and/or firmware of node 310 with respect to any compute, storage, network, and/or management resource 310. In this manner, each central controller 301 and the nodes 310 within the management domain 303 of central controller 301 coordinate the sending of event messages based at least in part on the event message handling capacity of the central controller 330. A benefit of the event messaging handling and management described herein is the ability to differentiate event messaging policies among the various nodes, thereby facilitating the ability to support different QoS levels for different nodes. Another benefit is the ability to detect and respond to changes in event messaging traffic that will inevitably occur during operation.

Figure 4:
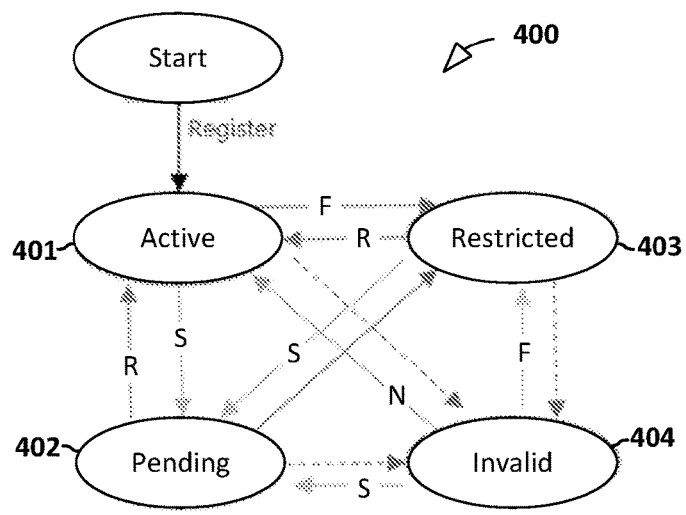
FIG. 4 illustrates event messaging states and state transitions associated with heartbeats.

Referring now to FIG. 4, a state transition diagram illustrates an exemplary event messaging policy 400 that may be employed by the event messaging resources 300 illustrated in FIG. 3. The event messaging policy 400 illustrated in FIG. 4 is based on an implementation employing four event message states maintained by each node, wherein each event message state may correspond to a message handling capacity of the central controller, and four heartbeat types generated by and sent from the central controller to signal the central controller's message handling capacity and to transition the event messaging state of the applicable nodes in accordance with messaging policy 400.

The event message states illustrated in the state transition diagram of FIG. 4 include an active state 401, a pending state 402, a restricted state 403, and an invalid state 404. The heartbeats illustrated in FIG. 4 include a normal heartbeat 411, a suspend heartbeat 412, a flow control heartbeat 413, and a recover heartbeat 414. In addition, FIG. 4 illustrates a heartbeat timeout condition 415, which may occur whenever the interval of time since the last heartbeat was generated by the central controller exceeds a specified timeout value. Those of ordinary skill will readily appreciate that the use of four event message states and four heartbeat types is an implementation specific design choice and that other implementations may employ more, fewer, and/or different event message states and more, fewer, and/or different heartbeat types.

In at least one embodiment, central controller 301 may issue a flow control (F) heartbeat 413 whenever an event message handling capacity of a central controller 301 exceeds or falls below a specified threshold. The message handling capacity of a central controller 301 may be measured in terms of messages/second, a maximum latency, or a combination of those and/or other parameters. A flow control heartbeat 413 may include an indication of a minimum interval parameter, wherein a value of the minimum interval parameter may indicate a minimum interval of time required between successive messages sent from any given node. Flow control heartbeats 413 may further include or otherwise indicate a scope parameter indicative of one or more specific nodes 310 to which the restricted state applies. In this context, the scope may refer to the nodes 310 to which the restricted event messaging state applies. The scope feature of the flow control heartbeat may facilitate differentiated levels of QoS among nodes 310. As an example, a prioritized node 310 may be excluded from the scope of a flow control heartbeat to permit that prioritized node 310 to remain in an active state. At the same time, other nodes may transition to restricted state 403, in which event message reporting is subject to the previously-referenced minimum interval.

FIG. 4 further illustrates a transition from active state 401 to pending state 402 in response to a suspend heartbeat 412. Suspend heartbeats may be generated by a central controller 301 in anticipation of a reset, system boot, or similar event ahead of a planned outage of the central controller to implement a configuration change or to perform some other management or maintenance task. In these embodiments, pending state 402 may correspond to an event message reporting policy in which the applicable node stores, rather than sends, new node event messages 316 corresponding to reportable events and occurring after the suspend heartbeat is processed and for as long as the event messaging state remains in the pending state. In the embodiment illustrated in FIG. 4, a central controller may remain in the pending state until a normal heartbeat is received, in which case the central controller event message state may transition to active state 401, or a flow control heartbeat is received, in which case the event messaging state transitions to the restricted state 403. In at least some embodiments, a node 310 may respond to a suspend heartbeat 412 by recording an identifier of the last event message processed and/or sent by the node. In some embodiments, event messages are assigned or otherwise associated with a unique value that increases monotonically with time. A suspend heartbeat may also include a next heartbeat parameter that indicates an estimate of when the central controller will be back in an operational state. Each node 310 may use the value of the next heartbeat parameter to determine when to resume the monitoring and processing of heartbeats.

The state transition diagram of FIG. 4 illustrates an implementation in which the event messaging state of a central controller 301 is transitioned to the invalid state 404 whenever a node 310 fails to detect a heartbeat signal from the central controller for a duration that exceeds a specified threshold value, which may be referred to herein as the timeout value.

Figure 5:
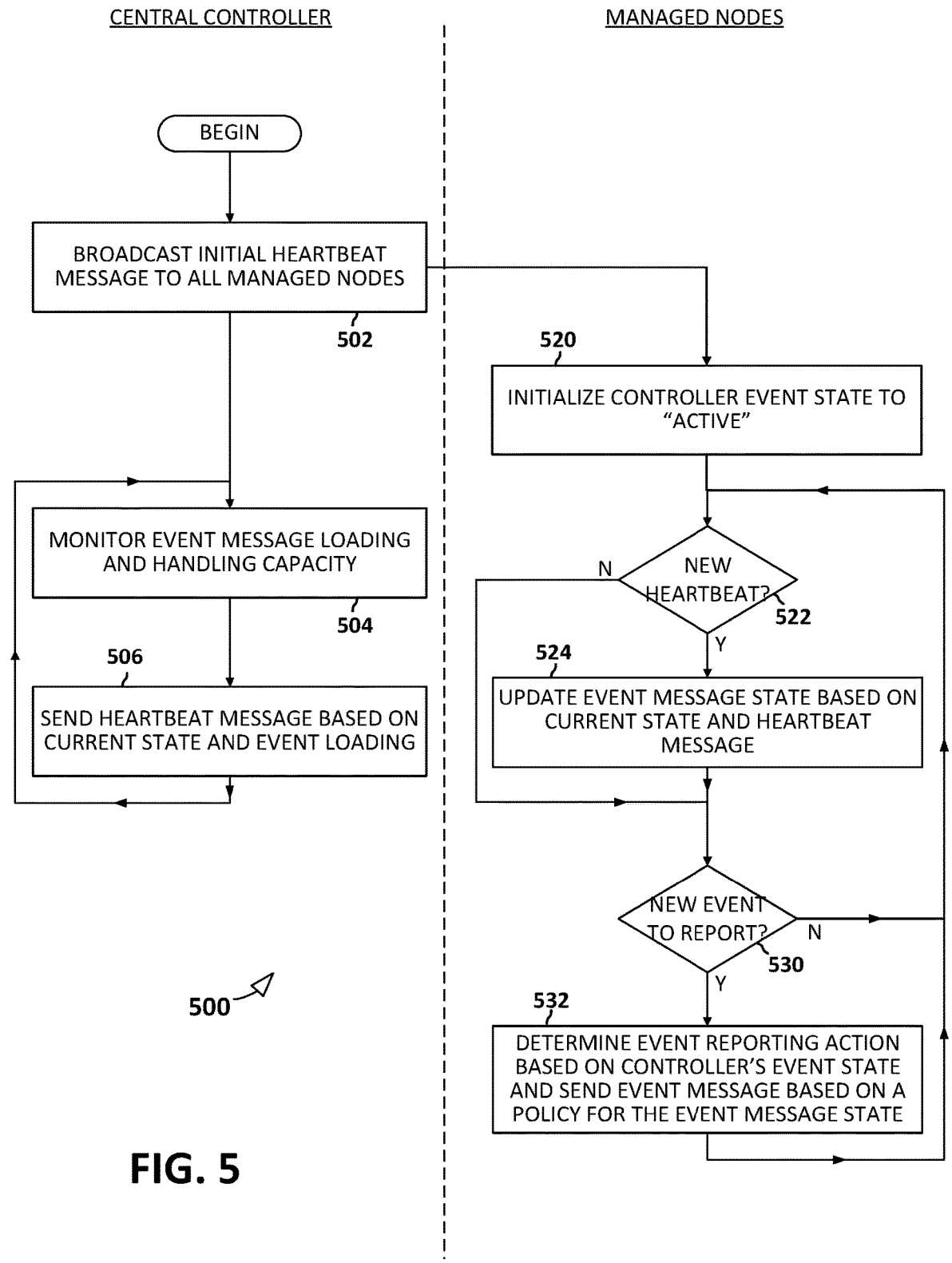
FIG. 5 illustrates a flow diagram of an event message management method.

Referring now to FIG. 5, a flow diagram illustrates a method 500 for managing and monitoring event messages in a distributed computing environment, such as the HCI environment illustrated in FIG. 1. Method 500 is illustrated in FIG. 5 with actions performed by the central controller on the left side and actions performed by one or more of the managed nodes on the right side.

The illustrated method begins with the central controller broadcasting (operation 502) an initial heartbeat to all managed nodes. In at least some embodiments, the initial heartbeat is a normal heartbeat that transitions each of the managed nodes to the active event message state 401 (illustrated in FIG. 4). The initial heartbeat and all subsequent heartbeats may be broadcast to all managed nodes simultaneously, e.g., via UDP multicasting.

After broadcasting the initial heartbeat, the central controller monitors (operation 504) its event message loading and/or its capacity to process pending event messages. In at least one embodiment, the central controller may distinguish between at least two event message handling capacities including a normal event message handling capacity in which event messages are processed immediately or without appreciable delay. In some implementations, the normal event message handling capacity is determined subject to a QoS parameter, which may be indicative of a maximum latency associated with event message handling.

Based upon the event message handling capacity determination made by the central controller in operation 504, the central controller may send (operation 506) a suitable heartbeat based on or influenced by the determined event messaging handling capacity.

As illustrated on the right side of FIG. 5, each managed node may respond to receiving the initial heartbeat from the central controller by initializing an event message state for the central controller to the active state (operation 520). Managed nodes may then monitor (operation 522) for any new heartbeats from the central controller. Upon receiving a new heartbeat, each managed node may update (operation 524) the central controller's event message state based on the current event message state and the type of heartbeat as discussed above with respect to FIG. 3 and FIG. 4. When a managed node next detects (operation 530) a reportable event, the managed node determines (operation 532) the event action based on the central controller's event message state and the corresponding event message policy as illustrated in FIG. 3 and FIG. 4 and described above.

Figure 6:
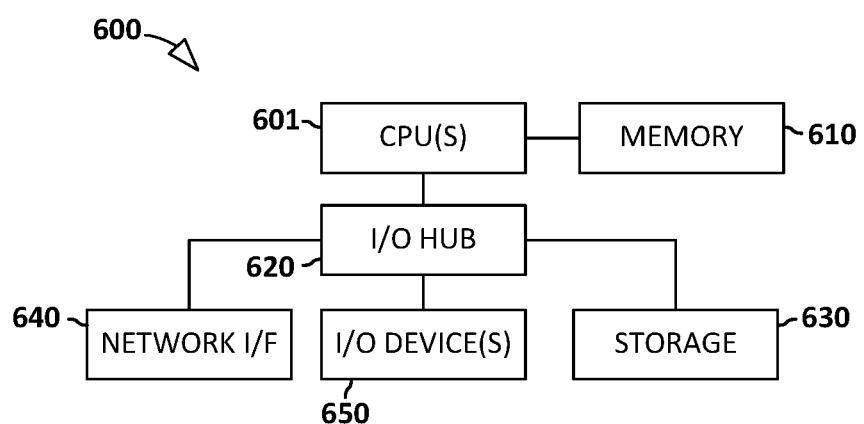
FIG. 6 illustrates a block diagram of an exemplary information handling system.

Any or all of the HCI components illustrated or described herein, including virtualized components and resources, may be instantiated on an information handling system 600 illustrated in FIG. 6. The illustrated information handling system 600 includes one or more general purpose processors or central processing units (CPUs) 601 communicatively coupled to a memory resource 610 and to an input/output hub 620 to which various I/O resources and/or components are communicatively coupled. The I/O resources explicitly depicted in FIG. 6 include a network interface 640, commonly referred to as a NIC (network interface card), storage resources 630, and additional I/O devices, components, or resources 650 including as non-limiting examples, keyboards, mice, displays, printers, speakers, microphones, etc. Although not explicitly depicted in the FIG. 6, some embodiments of information handling system 600, including some server embodiments, may include a baseboard management controller providing, among other features and services, an out-of-band management resource which may be coupled to a management device. Similarly, although not explicitly depicted in FIG. 6, at least some notebook, laptop, and/or tablet embodiments of information handling system 600 may include an embedded controller (EC) providing some management functions that may include at least some functions, features, or services provided by the baseboard management controller in some server embodiments.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system management method, wherein the method comprises:
   configuring a central controller to send heartbeats to a plurality of nodes, wherein the heartbeats are indicative of a message handling capacity of the central controller; and
   configuring each of the plurality of nodes to:
      receive heartbeats from the central controller and maintain an event messaging state of the central controller based on the heartbeats; and
      responsive to an occurrence of a reportable event, determine a reporting policy corresponding to the event messaging state and send, in accordance with the reporting policy, a message indicative of the reportable event to the central controller.

2. The method of claim 1, wherein:
   each heartbeat comprises one or more uniform datagram protocol (UDP) compliant packets;
   the plurality of nodes comprises a plurality of managed nodes, wherein each managed node comprises a node managed by the central controller; and
   configuring the central controller to send the heartbeats comprises configuring the central controller to multicast the one or more UDP-compliant packets to the plurality of managed nodes.

3. The method of claim 1, wherein:
   each of the heartbeats is of a type selected from a group of heartbeat types;
   the event messaging state is selected from a group of event messaging states;
   the group of heartbeat types includes a normal heartbeat and the group of event messaging states includes an active state, wherein the plurality of nodes are configured to assign the active state in response to receiving a normal heartbeat; and
   the reporting policy corresponding to the active state enables the plurality of nodes to report new events without delay.

4. The method of claim 3, wherein:
   the group of heartbeat types includes a flow control heartbeat and the central controller is configured to send a flow control heartbeat responsive to detecting a message handling capacity below a threshold capacity;
   the group of event messaging states includes a restricted state and the plurality of nodes are configured to transition the event messaging state to the restricted state responsive to receiving a flow control heartbeat; and
   the reporting policy corresponding to the restricted state imposes a minimum interval between event messages.

5. The method of claim 4, wherein the flow control heartbeat includes an indication of the minimum interval.

6. The method of claim 4, wherein the flow control heartbeat includes an indication of nodes to which the flow control heartbeat applies.

7. The method of claim 4, wherein:
the group of heartbeat types includes a suspend heartbeat and the central controller is configured to send a heartbeat prior to a central controller reboot;
the group of event messaging states includes a pending state and the plurality of nodes are configured to transition the event messaging state to the pending state responsive to receiving a suspend heartbeat; and
the reporting policy corresponding to the pending state prevents the plurality of nodes from sending reporting messages.

8. The method of claim 7, wherein each node receiving the suspend heartbeat records an identifier of a last reported message and stores new messages while the central controller remains in the pending state.

9. The method of claim 8, wherein:
the group of heartbeat types includes a recover heartbeat; and
the plurality of nodes are configured to transition the event messaging state from either the restricted state or the pending state to the active state responsive to receiving a recover heartbeat.

10. The method of claim 9, wherein the plurality of nodes in which the event messaging state is pending are configured to respond to receiving the recover heartbeat by sending stored messages occurring after the last recorded message to the central controller.

11. An information handling system, comprising:
a processor; and
non-transitory storage, communicatively coupled to the processor, and including processor-executable instructions that, when executed, cause the information handling system to perform management operations comprising:
configuring a central controller to send heartbeats to a plurality of nodes, wherein the heartbeats are indicative of a message handling capacity of the central controller; and
configuring each of the plurality of nodes to:
receive heartbeats from the central controller and maintain an event messaging state of the central controller based on the heartbeats; and
responsive to an occurrence of a reportable event, determine a reporting policy corresponding to the event messaging state and send, in accordance with the reporting policy, a message indicative of the reportable event to the central controller.

12. The information handling system of claim 11, wherein:
each heartbeat comprises one or more uniform datagram protocol (UDP) compliant packets;
the plurality of nodes comprises a plurality of managed nodes, wherein each managed node comprises a node managed by the central controller; and
configuring the central controller to send the heartbeats comprises configuring the central controller to multicast the one or more UDP-compliant packets to the plurality of managed nodes.

13. The information handling system of claim 11, wherein:
each of the heartbeats is of a type selected from a group of heartbeat types;
the event messaging state is selected from a group of event messaging states;
the group of heartbeat types includes a normal heartbeat and the group of event messaging states includes an active state, wherein the plurality of nodes are configured to assign the active state in response to receiving a normal heartbeat; and
the reporting policy corresponding to the active state enables the plurality of nodes to report new events without delay.

14. The information handling system of claim 13, wherein:
the group of heartbeat types includes a flow control heartbeat and the central controller is configured to send a flow control heartbeat responsive to detecting a message handling capacity below a threshold capacity;
the group of event messaging states includes a restricted state and the plurality of nodes are configured to transition the event messaging state to the restricted state responsive to receiving a flow control heartbeat; and
the reporting policy corresponding to the restricted state imposes a minimum interval between event messages.

15. The information handling system of claim 14, wherein the flow control heartbeat includes an indication of the minimum interval.

16. The information handling system of claim 14, wherein the flow control heartbeat includes an indication of nodes to which the flow control heartbeat applies.

17. The information handling system of claim 14, wherein:
the group of heartbeat types includes a suspend heartbeat and the central controller is configured to send a heartbeat prior to a central controller reboot;
the group of event messaging states includes a pending state and the plurality of nodes are configured to transition the event messaging state to the pending state responsive to receiving a suspend heartbeat; and
the reporting policy corresponding to the pending state prevents the plurality of nodes from sending reporting messages.

18. The information handling system of claim 17, wherein each node receiving the suspend heartbeat records an identifier of a last reported message and stores new messages while the central controller remains in the pending state.

19. The information handling system of claim 18, wherein:
the group of heartbeat types includes a recover heartbeat; and
the plurality of nodes are configured to transition the event messaging state from either the restricted state or the pending state to the active state responsive to receiving a recover heartbeat.

20. The information handling system of claim 19, wherein the plurality of nodes in which the event messaging state is pending are configured to respond to receiving the recover heartbeat by sending stored messages occurring after the last recorded message to the central controller.

* * * * *